United States Patent [19]
Lukas et al.

[11] Patent Number: 4,712,861
[45] Date of Patent: Dec. 15, 1987

[54] TWO-CHANNEL HERMAPHRODITIC FIBER CONNECTOR

[75] Inventors: Helmut H. Lukas, Carleton Place; Grant K. Pacey, Stittsville, both of Canada

[73] Assignee: Northern Telecom Limited, Montreal, Canada

[21] Appl. No.: 699,278

[22] Filed: Feb. 7, 1985

[51] Int. Cl.[4] .................................................. G02B 6/38
[52] U.S. Cl. ................................ 350/96.21; 350/96.20
[58] Field of Search ........................... 350/96.20, 96.21; 339/44 R, 44 M

[56] References Cited

U.S. PATENT DOCUMENTS

| | | | |
|---|---|---|---|
| 4,197,959 | 4/1980 | Kramer | 339/44 M X |
| 4,245,887 | 1/1981 | Johnson | 350/96.21 |
| 4,405,201 | 9/1983 | Cefarelli et al. | 350/96.21 |
| 4,455,750 | 5/1984 | Grois et al. | 350/96.21 |

OTHER PUBLICATIONS

Dalgleish et al., "Test Methods and Performance of a Multi-Channel Hermaphroditic Optical Fiber Connector", 30th *International Wire & Cable Symposium Proceedings*, Nov. 1981, pp. 445–453.

Primary Examiner—John Lee
Attorney, Agent, or Firm—Thomas Adams

[57] ABSTRACT

A connector for hermaphroditic coupling with a similar connector has a hermaphroditic end cap which mates with the end face of the connector body when the latter is not in use. To ensure that the end cap is correctly located immediately the connector is disconnected, it is hinged to the connector body and spring-loaded to bias it closed. When two connectors are connected together, their respective end caps mate automatically so that they too are kept clean. This is possible because each end cap can pivot to a position in which its end face is coplanar with that of the connector body. Various locking devices are disclosed for locking two connectors together and for locking the end cap closed.

24 Claims, 19 Drawing Figures

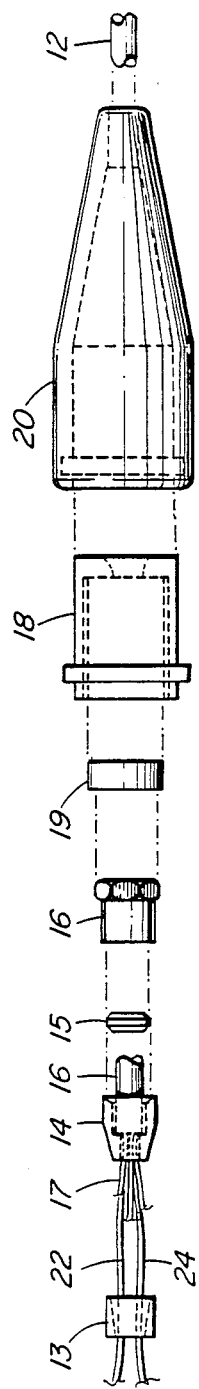

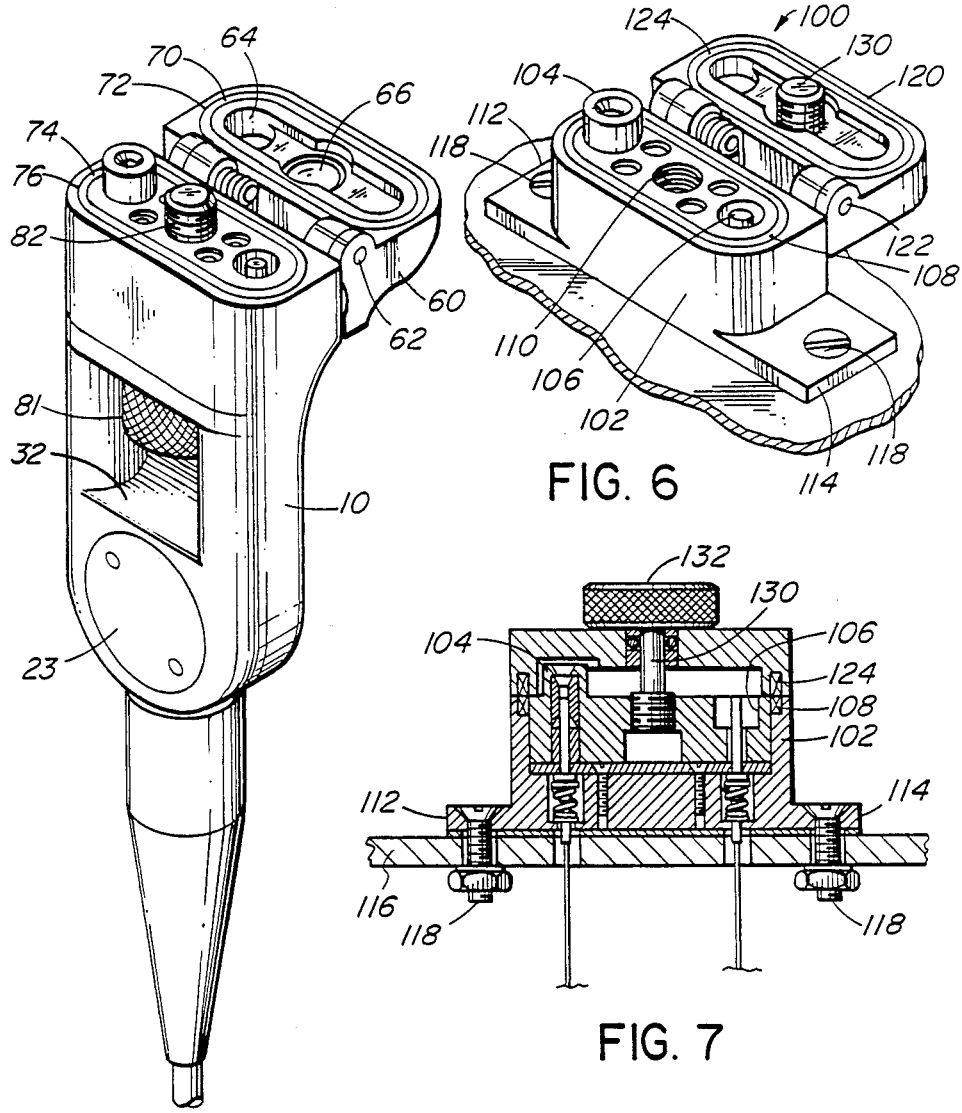
FIG. 6
FIG. 7
FIG. 3
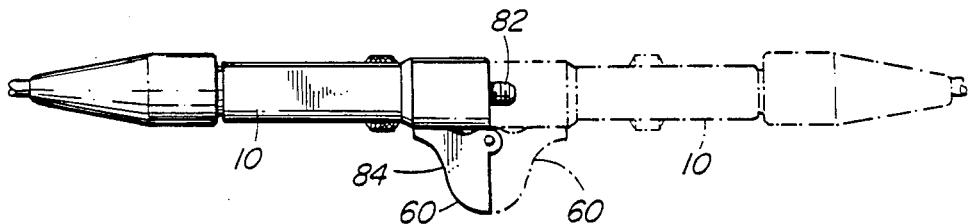
FIG. 5

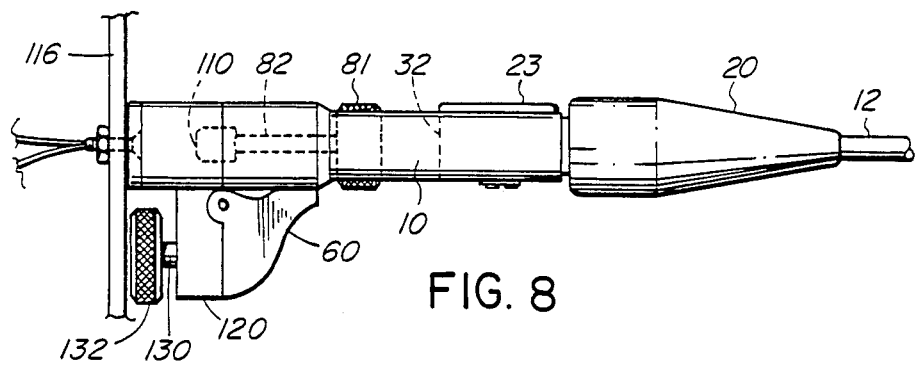
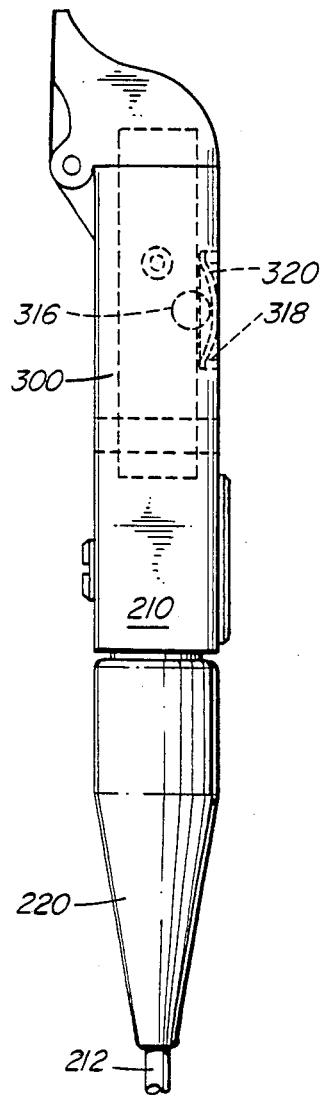
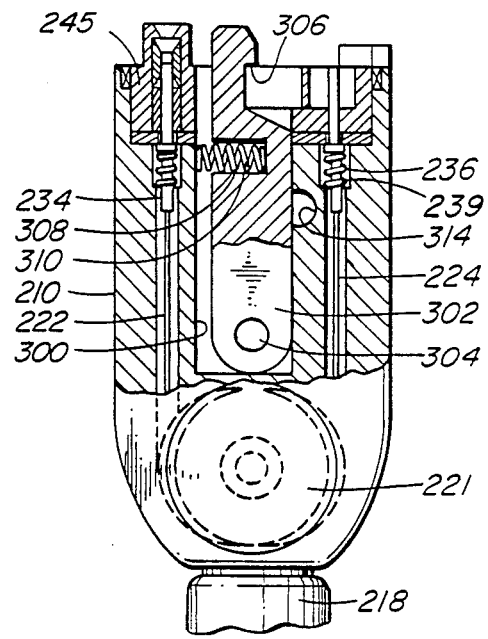
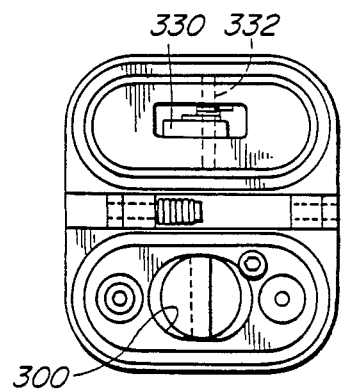
FIG. 8
FIG. 9
FIG. 10
FIG. 11

TWO-CHANNEL HERMAPHRODITIC FIBER CONNECTOR

FIELD OF THE INVENTION

The invention relates to releasable connectors and is especially applicable to hermaphroditic connectors for connecting optical fibers.

BACKGROUND OF THE INVENTION

Whether the connector is for optical fibers or electrical conductors, or other filaments, it is important that dirt or other foreign matter be kept from the mating surfaces since it can increase attentuation and prevent complete mating.

In order to prevent the ingress of dirt, it is usual to provide a cap which fits over the end surface of the connector when the latter is not in use. The cap itself must be kept clean when it is not in use. It has been proposed to have the caps of the mating connectors secured by chains to their respective connectors and fitted together after the connectors themselves have been connected together. This is not entirely satisfactory since, in the field, operators sometimes forget to connect the caps together. Also, the chain sometimes snags when the cable is being drawn through cavities or undergrowth. Sometimes the chain breaks and the cap gets lost, with the consequence that the connector itself then gets dirty.

SUMMARY OF THE INVENTION

The present invention seeks to overcome these problems.

According to the present invention, a hermaphroditic connector for optical fibers, electrical conductors and the like comprises:

a body having an end face formed for mating hermaphroditically with the corresponding end face of a corresponding end face of another such connector;

The end cap is hingedly attached to said body the hinge axis extending substantially parallel to a plane through a male/female pair of hermaphroditic formations and pivotal between a closed position, in which it covers the end face of the body, and an open position, the arrangement being such that when two such connectors are mated hermaphroditically, their respective end caps will cooperate with each other to prevent ingress of contamination therebetween. Preferably the end cap is spring-urged into the closed position.

BRIEF DESCRIPTION OF THE DRAWINGS

Embodiments of the invention will now be described by way of example only, and with reference to the accompanying drawings, in which:

FIG. 3 is a perspective view of the connector;
FIG. 4 is an exploded detail view;
FIG. 5 shows two connectors fastened together;
FIG. 6 is a perspective view of a bulkhead-mountable connector in the open condition;
FIG. 7 is a cross-sectional side view of the connector of FIG. 6;
FIG. 8 is a side view of a bulkhead connector with a plug connector attached;
FIG. 9 is a side view of a second plug connector embodying the invention;
FIG. 10 is a part-sectional plan view of the second plug connector;
FIG. 11 is an end view of the end of the second connector body, with its end cap in the open position.

DESCRIPTION OF THE PREFERRED EMBODIMENTS

Figure 1:
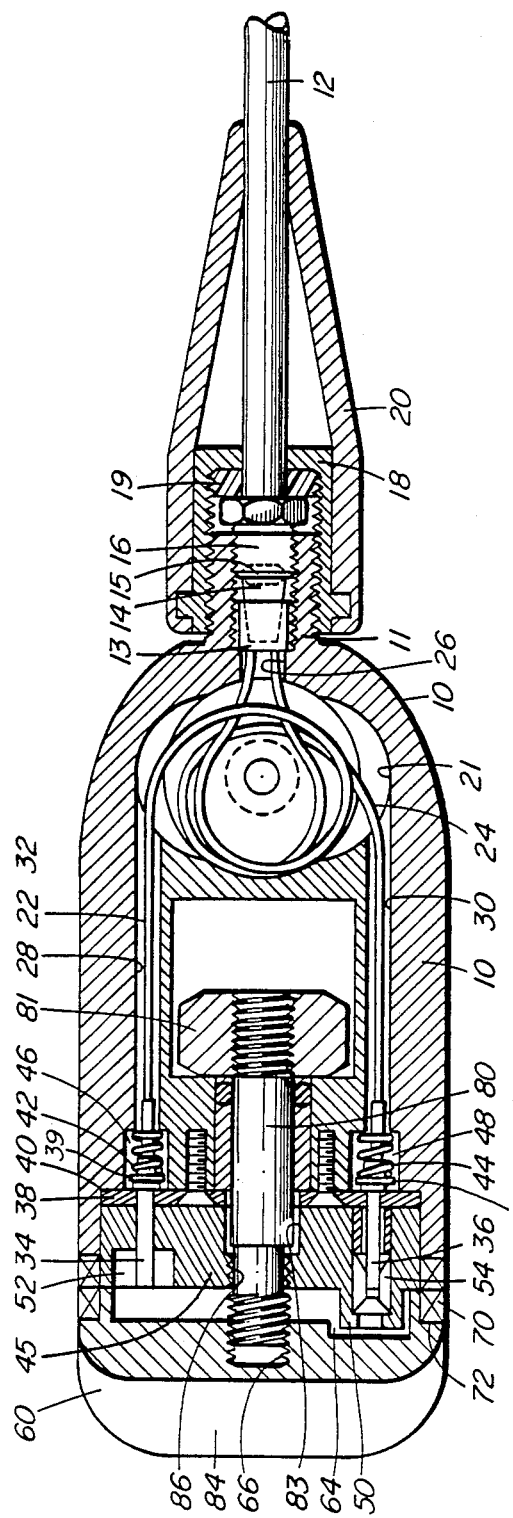
FIG. 1 is a sectional plan view of a connector.
Figure 2:
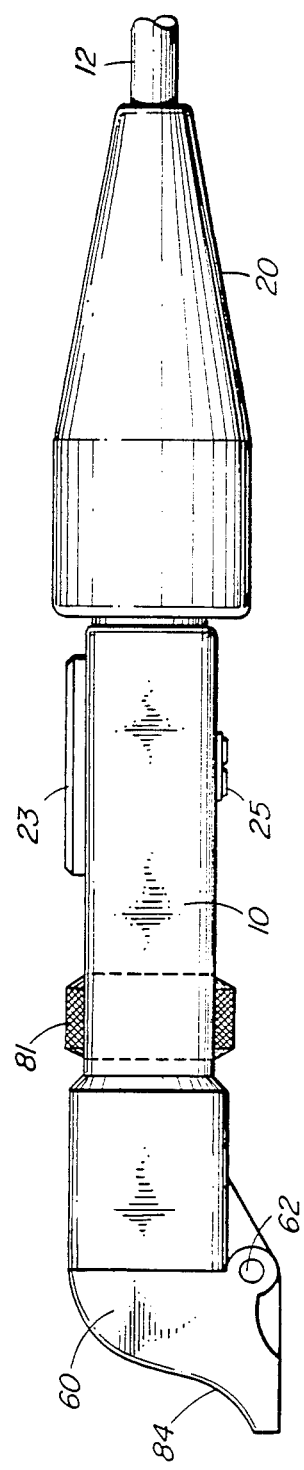
FIG. 2 is a side view of the connector.

Referring to FIGS. 1, 2 and 3, a hermaphroditic connector, for connecting two optical fibers to a similar connector, comprises a generally flat, elongate plug body 10. A cylindrical, externally-screwthreaded boss 11 protrudes from one end of the plug body 10.

An optical fiber cable 12 passes through the boss 11 and is secured thereto by a pair of nesting collets 13 and 14, respectively, a conical washer 15 and a hollow nut 16 (see FIG. 4). The leading collet 13, i.e. that adjacent the plug body 10, is tapered internally to receive the other collet 14 which is tapered externally at the same angle. The narrow end of collet 14 is radiussed and its bore is stepped to provide a narrow bore adjacent its narrow end and a wider bore adjacent its wider end. The plastic sleeve of the cable 12 fits into the wider bore of collet 14 and butts up against the step. The Kevlar (trademark) reinforcing or supporting strands 17 (see FIG. 4) extend through the narrow bore and are folded back and trapped between the mating surfaces of the two collets 13 and 14.

The conical washer 15 is conical on both sides and fits between a corresponding recess in the end of collet 14 and a similar recess in the end of cylindrical nut 16. The conical washer 15 is of synthetic plastics material and, as the nut 16 is tightened, washer 15 not only forces the collets 13 and 14 together, but also distorts to clamp the cable sleeve.

A gland nut 18 fits over the end of boss 11 and clamps a sealant body 19 (conveniently applied in strip form) against nut 18 to seal the cable sleeve to the plug body. A protective sleeve or boot 20 surrounds the gland nut and extends along the cable to limit flexing.

Within the plug body 10, adjacent the boss 11, is a cylindrical chamber 21. The two optical fibers 22 and 24, respectively, pass into the chamber 21 through the boss 11 and a hole 26 communicating between the boss 11 and the chamber 21. The chamber 21 is sealed by a cover plate 23 held in place by a screw 25 (see FIG. 2).

In the chamber 21, the fibers are coiled several times and emerge tangentially, one at each side of the plug body 10. The fibers 22 and 24 pass, in channels 28 and 30, respectively, either side of an aperture 32, which extends through the plug body 10 between its major surfaces.

The ends of the fibers 22 and 24 are terminated in ferrules 34 and 36, respectively, which protrude longitudinally from the plug body 10. The ferrules 34 and 36 are retained relative to the plug body 10 by a retainer plate 38 which is secured by screws to the base of a recess 40 in the end of the plug body 10. Split sleeves 39 and 41 fit around the ferrules 34 and 36, respectively. The sleeves are fitted sideways to locate internally of a central shoulder on the ferrule. Coil springs 42 and 44, respectively, housed in corresponding recesses 46 and 48, urge the split sleeves 34 and 41, and hence the ferrules 34 and 36, respectively, towards the retainer plate 38.

The outer ends of the ferrules 34 and 36 extend through an interface block 45 housed in the recess 40. The interface block 45 is hermaphroditically-formed, in that it has a boss 50 as the male member and a complementary recess 52 as the female member. Boss 50 and recess 50 are equidistant from the longitudinal centre line of the plug body 10. The ends of ferrules 34 and 36 extend into recess 52 and boss 50, respectively. In the boss 50, the ferrule 36 is located by an alignment sleeve 54. As is usual with hermaphroditic connectors, the interface member or block 45 is intended to mate with an identical interface block of another connector.

An end cap 60 is attached to the mating end of plug body 10 by a hinge 62 (see FIG. 2). The hinge axis of hinge 62 extends along the width of the plug body 10. As shown in FIG. 3, the end cap 60 has a recess 64 to accommodate the male member or boss 50 and a screwthreaded hole 66 at a position corresponding to the centre line of the plug body 10. A seal 70, in a groove 72, extends around the perimeter of the end cap mating surface and, when the end cap 60 is closed, cooperates with a corresponding seal 74 in a groove 76 in the end face of the plug body 10 (as shown in FIG. 3). The seals 70 and 74 prevent the ingress of dirt or moisture onto the opposed faces of the end cap 60 and plug body 10.

The end cap is locked or retained in the closed position by a locking screw 80 which has a knurled thumb wheel 81 at one end located in central aperture 32, and a shank 82 extending longitudinally through a hole 83 in the plug body 10 to emerge from the end face of interface member 45. The end of the shank 82 is screwthreaded to fit the hole 66 in the end cap 60.

The end cap 60 can be opened very conveniently by grasping the plug body 10 in the palm of the hand and using the thumb to pivot the end cap 60. Full rotation to the position shown in FIG. 3 is facilitated by concave formation, as at 84, of the surface of the end cap remote from the plug body 10.

To fasten two such connectors together, the screw 80 of one only of the connectors is unscrewed as far as possible, so that its screwthreaded end portion passes through a correspondingly screwthreaded constriction 86 in the hole 83 through interface block 45. Each end cap is opened so that its end face is coplanar with the end face of its plug body 10, as shwon in FIG. 3. The two connectors are then brought together, as illustrated in FIG. 5, so that the plug bodies 10 mate and, at the same time, the two end caps 60 mate. Thus, the seals 74 (not shown in FIG. 5) in the plug bodies will cooperate to stop ingress of dirt or moisture and the seals 70 in the end caps will cooperate to keep the end caps 60 clean.

The two plug bodies 10 are locked together by screwing the locking screw 80 of one into the screwthreaded constriction 86 (see FIG. 1) of the other, which had been previously vacated by withdrawing its own locking screw, as described previously.

The connector can also be connected to a bulkhead-mounted receptacle. Such a receptacle is illustrated in FIG. 6 (open) and FIG. 7 (closed). The receptacle 100 comprises a body part 102 corresponding to the end portion of the previously described plug body 10. Thus, the receptacle has a male member in the form of a boss 104, a female member in the form of a recess 106, a peripheral seal 108 and a central, screwthreaded hole 110. The receptacle has flanges 112 and 114, respectively, whereby it is shown secured to a bulkhead 116 by screws 118. An end cap 120, similar to the end cap 60, previously described, is attached to the receptacle body by a hinge 122, and has a peripheral seal 124. The end cap differs in that it has a central screw 130, which protrudes through the end cap and has a thumbscrew 132 at its rear face (see FIG. 7). When the end end cap 120 is closed, the screw 130 is tightened, engaging in the central screwthreaded hole 110 of the receptacle body 102.

When a plug connector is connected to the receptacle, as illustrated in FIG. 8, the screw 130 in the end cap is withdrawn to prevent it impinging on the end cap 60 of the plug connector 10. The connector plug 10 is connected to the receptacle in the manner previously described for plug-to-plug connection and locked by screwing locking screw 82 into screwthreaded hole 110 in the bulkhead connector.

The plug connector illustrated in FIGS. 9 to 14 is similar to that shown in FIGS. 1 to 3, but differs because it has a pawl locking mechanism instead of a screw 80 to lock the plug connector to its end cap or another connector. Since most parts of the connector are similar to that previously described, corresponding parts are identified by a reference number that is higher by two hundred than that used previously.

Referring to FIGS. 9 to 14, the plug connector has a flat, elongate plug body 210 connected to an optical fiber cable 212 via a sleeve 220. Inside the plug body 210 two optical fibers 222 and 224, respectively, are coiled in a chamber 221 and leave it tangentially, each adjacent a different edge of the plug body. The fibers 222 and 224 terminate in ferrules 234 and 236, respectively, which are located in interface block 245. A hole 300, of elliptical cross-section, extends through the interface block 245 and into the plug body 210, extending almost all the way to the chamber 221. The hole 300 accommodates a detent lever 302 which is of circular cross-section and is secured, at its innermost end, by a pivot pin 304.

Adjacent its distal end, the lever 302 is undercut or notched at one side to form a lip 306. At the opposite side, the lever 302 has a transversely-extending recess 308 which houses a coil spring 310. The coil spring 310 acts between the bottom of recess 308 and the opposed sidewall of hole 300 to urge the lever 302, in the direction of lip 306, against the other sidewall of the hole 300. In this opposite sidewall of hole 300 is a circular cross-section recess 314 housing a spring-loaded ball 316. The ball 316 projects sideways into the hole 300 and outwards into a shallow recess 318 in the flat surface of the plug body. A diaphragm 320 (FIG. 9), extending across the recess 318, retains the ball 316 in the recess 314. Depression of the diaphragm 320, and therewith the ball 316, against the action of spring 322 (see FIG. 14), displaces the lever 302 against the action of spring 310, to release the detent.

Figure 13:
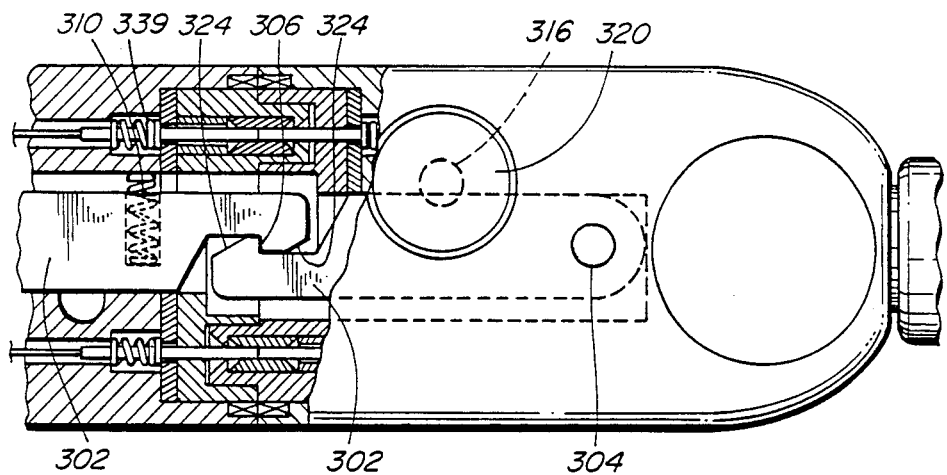
FIG. 13 is a part-sectional view of two connectors connected together.

FIG. 13 shows two plug connectors connected together. Their end surfaces and end caps mate as previously described. However, they are locked together by their respective detent levers 302, the lips 306 of which interengage. The end of each lever 302 has an inclined surface 324 extending away from the lip 306 so that, when two connectors are being brought together end-to-end, the levers will be biased apart by the inclined surface 324 of one acting against the inclined surface 324 of the other. The detent levers 302 can be released by depressing their associated balls 316.

Figure 12:
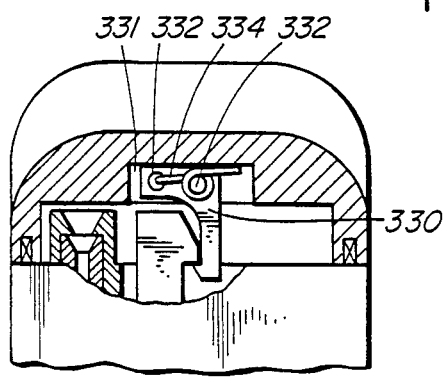
FIG. 12 is a part-sectional detail view of the end of the connector with the end cap closed.
Figure 14:
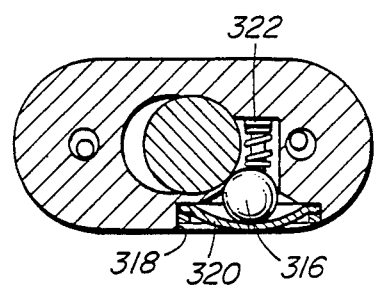
FIG. 14 is a sectional view on the line AA of FIG. 12.

FIGS. 11 and 12 show the end cap of the detent lever-type of connector. The cap is hermaphroditically adapted to mate with the plug-connector end face, as before, but in this case has a pawl 330 mounted in a recess 331 to engage the lip 306 on lever 302 when the cap is closed. The pawl 330 is of right-angled shape and is pivotally mounted at its corner portion on a pivot pin 332. A torsion spring 334, also mounted on the pivot pin 332, acts between the base of recess 331 and a lug 332 on the pawl to bias the latter into engagement with the lever 302 when the cap is closed. The end cap is released by displacing the lever 302 by means of its associated ball 316 (see FIG. 9).

Figure 15:
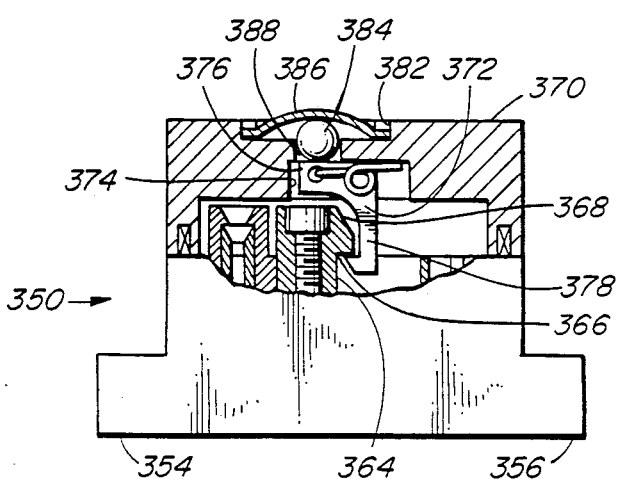
FIG. 15 is a part-sectional side view of a second bulkhead connector embodying the invention.
Figures 16, 17, 18, 19:
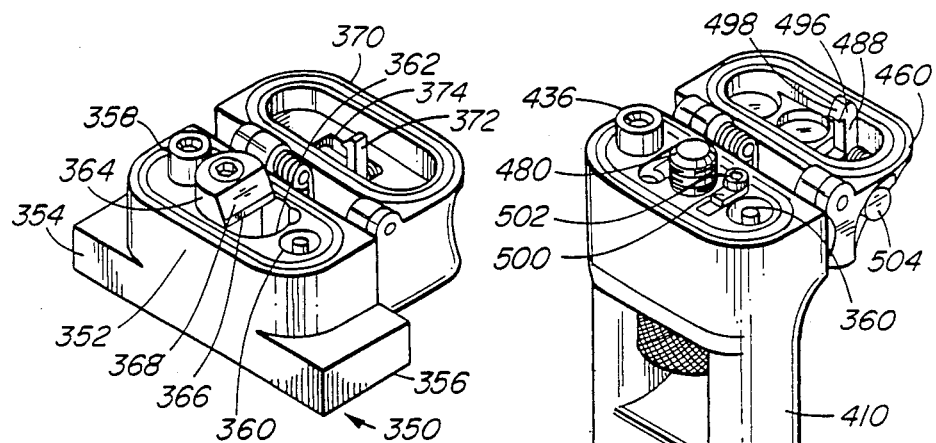
FIG. 16 is a perspective view of the bulkhead connector of FIG. 15, with its end cap open.
FIG. 17 is a perspective view of a modification of the first connector.
FIG. 18 is a partial side view of the modified connector.
FIG. 19 is a modified plan view of the modified connector.

The detent lever-type of connector may be coupled to a bulkhead connector which is illustrated in FIGS. 15 and 16. The bulkhead connector 350 has a body part 352 with two flanges 354 and 356, respectively, for fastening it to a bulkhead or plate. The body part 352 has a male coupling part in the form of boss 358 and a complementary female coupling part in the form of recess 360. Between them is an elliptical hole 362 accommodating a detent 364. The detent 364 comprises a round rod which protrudes outwards from the end face of the body part 352 and has a lip 366 and inclined surface 368 similar to those on the lever 302 in the plug connector. The end cap 370 of the bulkhead connector has a pawl 372, in the form of a right-angled lever mounted in a shallow recess 374. One arm 376 of the lever lies along the bottom of the recess 374 and the other arm 378 protrudes from the recess 374 to engage the lip 366 on the undercut end of the detent rod.

A further recess 382, on the outer surface of the end cap 370, houses a ball 384 and an overlying diaphragm 386. The ball 384 is located in a hole 388 extending between recess 382 and the recess 374 housing the pawl 372. The ball rests against the arm 376 of the pawl 372 so that depression of the diaphragm, and hence the ball 384, will pivot the pawl out of engagement with the detent rod.

FIGS. 17, 18 and 19 show a modified plug connector which has a plug body 410 similar to that of the connector illustrated in FIGS. 1, 2 and 3, in that it has a connector boss 436 and complementary recess 360, a locking screw 480 and a hinged end cap 460. The locking screw 480 serves to lock two connectors together so that they will withstand a load of more than 400 pounds when the cable is being drawn. In addition, the connector has a latch 488 to secure the cap in the closed position, whether the locking screw is used to secure the cap or not.

The latch 488 comprises a right-angled lever 490 mounted on a pivot pin 492 in a recess 494 in the end cap 460. The pivot axis extends widthways transversely to the longitudinal centre line of the connector. One arm 496 of the latch 488 is pointed and undercut at one end to form a pawl 498. As can be seen from FIG. 19, the pawl 498 is arranged to engage behind a lip formed by striker plate 500 secured to the plug body by screw 502.

The latch 488 can be released by pivoting the right-angled lever 490 to release pawl 498. The release mechanism comprises a shaft 504 mounted in a cylindrical hole 506 with its longitudinal axis parallel to the pivot axis of pawl 498. The shaft 504 protrudes laterally into the recess 494 to engage the arm 508 of lever 490 adjacent the base of recess 494. The shaft 504 has a neck portion 510 of lesser diameter with inclined shoulders. When the latch is in the "closed" position, with pawl 498 engaged behind plate or lip 500, the arm 508 lies against the neck portion 510. The ends of the shaft 504 project beyond the sides of the end cap. Depression of one end of the shaft 504 to slide the shaft 504 longitudinally causes the pivot arm 508 to ride up one of the shoulders, causing the lever to pivot and relase the pawl 498.

A ball 512 is located in a hole 514 communicating with the hole 506 containing the shaft and is biased by a spring 576 into contact with the shaft 504. The spring-loaded ball 512 locates in the neck portion to locate the shaft positively in the position corresponding to engagement of the pawl 498.

What is claimed is:

1. A hermaphroditic connector, for optical fibers and the like, comprising:
    a body having an end face adapted for mating hermaphroditically with a corresponding end face of another such connector; and
    an end cap having an end face formed for mating hermaphroditically with said end face of said body; said end cap being hingedly attached to said body adjacent its end face and pivotal between a closed position, in which the end face of the end cap mates with the end face of the body, and an open position in which the end face of said end cap is substantially coplanar with the end face of said body, the arrangement being such that when two such connectors are connected end-to-end with their respective end caps in said coplanar position, the respective body end faces mate hermaphroditically and the two end caps mate hermaphroditically.

2. A connector as defined in claim 1, wherein said body comprises locking means for locking said body to another body when the respective end faces of the two bodies are mated.

3. A connector as defined in claim 2, wherein said locking means comprises a screw member extending longitudinally from a screwthreaded hole in said end face of said body to engage in a corresponding screwthreaded hole in said end face of another body.

4. A connector as defined in claim 3 wherein said screw member is withdrawable from its screwthreaded hole to permit entry therein of the screw member of a mating connector.

5. A connector as defined in claim 3 or 4, wherein said end cap has a corresponding screwthreaded hole, such that the closed end cap may be locked by engagement of the screw member in the screwthreaded hole of the end cap.

6. A connector as defined in claim 4, wherein said end cap has a corresponding screwthreaded hole, such that the closed end cap may be locked by engagement of the screw member in the screwthreaded hole of the end cap.

7. A connector as defined in any one of claims 2 to 6 inclusive, wherein said locking means comprises a latch member protruding from the body end face, said latch member having a lip, and wherein said end cap comprises a pawl member arranged for snap-action engagement of said lip of said latch member when said end is closed, said end cap further comprising means for disengaging said pawl member from said lip.

8. A connector as defined in claim 7, wherein said pawl member comprises one arm of a lever, and said means for disengaging said pawl member comprises a ball located in a hole communicating between said lever and the exterior of the end cap, such that displacement of said ball actuates said lever to disengage said pawl member from said lip.

9. A connector as defined in claim 8, wherein said pawl member comprises one arm of a lever, and said means for disengaging comprises a slidable rod having a cam portion to engage said lever, such that reciprocating movement of said rod displaces said pawl into and out of engagement with said lip.

10. A connector as defined in claim 2, wherein said locking means comprises a detent member pivotally located in a longitudinal recess so as to protrude from the end face of the body, the protruding part having a lip to interengage a similar lip of a similar connector to lock the two connectors together with their end faces mating.

11. A connector as defined in claim 10, comprising means for disengaging said detent member, said means for disengaging comprising a ball slidably housed in a hole communicating with said longitudinal recess, such that movement of said ball into said recess will cause said ball to engage said detent member and pivot said detent member so as to disengage its lip from the lip of the other connector.

12. A connector as defined in claim 11, wherein said ball protrudes outwards into a second recess sealed by a flexible diaphragm.

13. A connector as defined in claim 10, 11 or 12 wherein said end cap comprises a pawl member arranged for snap-action engagement of said lip of said detent member when said end cap is closed, said end cap further comprising means for disengaging said pawl member to release said lip.

14. A connector as defined in claim 13, wherein said pawl member comprises one arm of a lever, and said means for disengaging said pawl member comprises a ball located in a hole communicating between said lever and the exterior of the end cap, such that displacement of said ball actuates said lever to disengage said pawl member from said lip.

15. A connector as defined in claim 13, wherein said pawl member comprises one arm of a lever, and said means for disengaging comprises a slidable rod having a cam portion to engage said lever, such that reciprocating movement of said rod displaces said pawl member into and out of engagement with said lip.

16. A connector as defined in claim 1, wherein said end cap is pivotal through substantially 180 degrees between said closed position and said open position, the connector having spring means for urging said end cap to the closed position.

17. A connector as defined in claim 1, further comprising sealing means for sealing said end face of said body to said end cap when such end cap is in said closed position, so as to prevent contamination of terminations of the optical fibers or the like, such sealing means serving also to seal said end face to an end face of a mating connector.

18. A connector as defined in claim 17, said sealing means being adjacent the perimeter of said end face of said body.

19. A connector as defined in claim 16, 17, or 18, wherein both said end cap and said end face have respective sealing means.

20. A connector as defined in claim 16, further comprising sealing means for sealing said end face of said body to said end cap when such end cap is in said closed position, so as to prevent contamination of terminations of the optical fibers or the like, such sealing means serving also to seal said end face to an end face of a mating connector.

21. A connector as defined in claim 20, said sealing means being adjacent the perimeter of said end face of said body.

22. A connector as defined in claim 16, 20 or 21, such that both said end cap and said end face have respective sealing means.

23. A connector as defined in claim 1, wherein said end cap has a formation extending away from both said end face and said hinge so as to serve as a lever to pivot said end cap from said closed position to said open position.

24. A hermaphroditic connector, for optical fibers and the like, comprising:
- a body having an end face adapted for mating hermaphroditically with a corresponding end face of another such connector; and
- an end cap connected to said body by a hinge with a hinge axis extending substantially parallel to a plane through a male/female pair of hermaphroditic formations, said end cap being pivotal between a closed position, in which it covers said end face of said body, and an open position;
- the arrangement being such that, when two such connectors are mated hermaphroditically, their respective end caps will cooperate with each other to prevent ingress of contamination therebetween.

* * * * *